Patented May 30, 1939

2,160,607

UNITED STATES PATENT OFFICE 2,160,607

EXTRACTION PROCESS

Willem J. D. van Dijck, The Hague, Netherlands, assignor to Shell Development Company, San Francisco, Calif., a corporation of Delaware No Drawing. Application July 1, 1935, Serial No. 29,383

7 Claims. (Cl. 196—13)

This invention relates to the separation of hydrocarbon mixtures into their component parts and is more particularly concerned with processes of manufacturing, by extraction, refined products from mineral oils, either crude or produced by distillation, cracking, hydrogenation, solvent extraction, or other processes.

In the development of extraction refining methods for treating mineral oils, a considerable number of substances were discovered to possess the qualities of selective solvents, that is, of solvents which may be used to separate hydrocarbon mixtures into portions respectively more paraffinic and less paraffinic than the original oil.

It has now been found that a large group of sulfur ring compounds, that is, heterocyclic organic compounds having at least one sulfur atom in the ring, possess to a high degree the properties of selective solvents suitable for treating hydrocarbon mixtures and may be used according to this invention to improve such of their characteristics as color, viscosity index, Conradson test, sulfur content, etc. This group comprises the following compounds: thiophene, benzo-thiophene, thiazole, penthiophene, etc., and their carbon substituted derivatives formed by the substitution of one or more hydrogen atoms attached to carbon atoms in the ring by an active group, or radicle, such as alkyls, $$-CN, -NO_2, =CO, -OR, -SCN, -COOR, -Cl, =O, -NH_2, =CS, C\underset{R}{\overset{O}{\diagup}}$$

where R designates either a hydrogen atom or an alkyl radicle, which may be either alphyl or aryl. These carbon substituted derivatives of the basic compounds may be illustrated, for example, by the following substances: alphyl thiophenes, such for example as $\alpha$ and/or $\beta$-methyl, and/or ethyl thiophenes, dimethyl and/or diethyl thiophenes, aryl thiophenes, such, for example, as tetraphenyl thiophene, chlor-thiophenes, nitro-thiophenes, cyano-thiophenes, amino-thiophenes, and thiophenic acids, alkyl benzo-thiophenes, such as $\alpha$ and/or $\beta$ methyl, and/or ethyl benzo-thiophene, chlor-benzo-thiophene, nitro-benzo-thiophenes, cyano-benzo-thiophenes, amino-benzo-thiophenes, and benzo-thiophenic acids, alkyl thiazoles, such as $\alpha$ and/or $\beta$ methyl, and/or ethyl thiazoles, chlor-thiazoles, nitro-thiazoles, cyano-thiazoles, amino-thiazoles, and thiazolic acids, benzo-thiazole or derivatives with one or more active groups, such as $NO_2$, alkyl penthiophenes, such as $\alpha$ and/or $\beta$ methyl and/or ethyl penthiophenes, chlor-penthiophenes, nitro-penthiophenes, cyano-penthiophenes, amino-penthiophenes, and penthionic acids.

Further, the products of mixed substitution of these products may be used for this process, such for example, as: cyano-hydroxy-thiophenes, nitro-hydroxy-thiophenes, chlor-hydroxy-thiophenes, chlor-amino-thiophenes, alkyl-amino-thiophenes, cyano-hydroxy-benzo-thiophenes, nitro-hydroxy-benzo-thiophenes, chlor-hydroxy-benzo-thiophenes, chlor-amino-benzo-thiophenes, alkyl-amino-benzo-thiophenes, cyano-hydroxy-thiazoles, nitro-hydroxy-thiazoles, chlor-hydroxy-thiazoles, chlor-amino-thiazoles, alkyl-amino-thiazoles, cyano-hydroxy-penthiophenes, nitro-hydroxy-penthiophenes, chlor-hydroxy-penthiophenes, chlor-amino-penthiophenes, alkyl-amino-penthiophenes etc.

Also condensation products of two or more thiophene nuclei and their carbon-substituted derivatives may be used. Examples of such compounds are thiopho-thiophene and dimethyl thiopho-thiophene.

So far as the mechanism of the extraction process itself is concerned, it may be carried out in any conventional manner, including the processes of batch or continuous countercurrent extractions, and such as those described in my applications Serial Nos. 455,959, filed May 26, 1930; 567,580, filed October 9, 1931; and 669,580, filed May 5, 1933. The solvents of my invention may be used either alone or in solutions with so-called naphthenic solvents, such as furfural, dichloroethyl ether, phenols, nitrobenzene, liquid $SO_2$, etc., and/or solvent diluents such as benzol and other aromatic hydrocarbons to which they are added in sufficient quantities to modify solvent characteristics. Often it may be desirable to dilute a viscous oil with a paraffinic diluent, such as liquid propane or other paraffinic solvent, and to extract the resultant solution.

The oil-solvent ratios may vary in different cases, depending together with the temperature of extraction, largely upon the characteristics of the hydrocarbon mixtures being treated and the properties of the desired product; excellent results have, however, been obtained by using 100% and 200% by volume of the solvent.

Example I

One volume of a mixture consisting of 21% tetraline and 79% decaline (decahydronaphthalene) was extracted at 0° C. with 0.6 vol. of thiophene aldehyde, the yield being a raffinate consisting of 15% tetraline and 85% decaline and an extract consisting of 38% tetraline and 62% decaline.

*Example II*

A mixture of 20% tetraline and 80% decane was extracted at −5° C. with 100% of benzothiazole. An extract was obtained consisting of 42% tetraline (tetrahydronaphthalene) and 58% decane. The raffinate consisted of 11% tetraline and 89% decane.

The extraction of oils with these new solvents may either precede or follow an extraction of the oil with other solvents. Thus, an oil may be first extracted with $SO_2$-benzol solution in one case and with liquid $SO_2$ in the other case, and the resulting raffinates (the oil portions of the raffinate phases) may be further refined by extraction with the solvents of this invention. Often it is desirable to extract with my solvents the raffinate or extract phases (oil plus a solvent) produced by refining with other solvents, without first freeing the oil from the solvent prior to such an extraction. The advantage of such a method resides in the elimination of the step of separating the oil from the solvent between the two extraction steps, and also in the improved extraction efficiency resulting from the combined effect of the two solvents in the oil.

As an example, a hydrocarbon oil may be first extracted with liquid $SO_2$, or furfural, or chlorex, or cresylic acid, or phenol, or nitro-benzene, or some other selective solvent, or a mixture of some of these solvents. In many cases the oil in the resulting raffinate phase, that is, in the solution of the solvent in the less soluble portion of the original oil, will have excellent characteristics insofar as the concentration of paraffinic components, the viscosity index, etc., are concerned, but will fail, for example, to possess a sufficiently good color. In such cases it is of great advantage to extract this phase further with one of the solvents of this invention or their mixture whereby a raffinate phase consisting of a highly refined oil and a mixture of the two solvents is obtained; the oil is then separated, e. g. by distillation either with or without steam, from the solvents, and each solvent may be separated from the other. The extract phase, i. e. the solution of a less paraffinic portion of the oil being treated in the solvents used, is also treated to separate oil and the solvents. The recovered solvents may then be used again in the process.

On the other hand, it was often found very advantageous to extract the fractions of hydrocarbon oils containing asphaltic substances, first with the solvents of this invention, used in the amounts which may be relatively small but sufficient to produce a positive effect in so far as the subsequent treatment with other solvents is concerned, and following this treatment of the oil by extracting the raffinate or the raffinate phase with such solvents as liquid $SO_2$ or furfural, or $\beta\beta'$-dichloroethyl ether or their equivalents mentioned hereinbefore. In the processes of this type the alkylated and/or nitrated derivatives of thiophene, benzo-thiophene, thiazole, penthiophene, and other sulfur ring compounds, were found particularly suitable for the first step of this process, whereby the asphaltic components of the oil are removed as extract without a great loss of the non-asphaltic components. The deasphaltized oil, i. e. either the raffinate phase or the raffinate separated at this stage, is then refined by extraction with a different selective solvent, such as liquid $SO_2$ or its equivalents, or some other sulfur-containing heterocyclic compounds described hereinbefore. The resulting raffinate and extract phases are separated from each other and each is treated further to separate oil and the solvent used.

For any of the above described methods of extracting hydrocarbon oils, it may often be desirable, when employing the solvents of this invention, to carry out the process in accordance with my invention disclosed in the application Serial No. 455,959, i. e. to counterflow one of the solvents of the present invention and another solvent of the type of liquid hydrocarbons, such as liquid propane, liquid butane, gasoline distillates, kerosenes, etc., often referred to as paraffinic solvents, through an extraction zone, while introducing at an intermediate point thereof the hydrocarbon mixture to be extracted. Upon being brought into contact with the two counterflowing solvents under suitable extracting conditions of temperature and pressure, the oil together with the solvents forms two liquid phases which separate within the extraction zone and are withdrawn therefrom. The withdrawn phases may then be treated to separate their oil portions from both or one of the solvents, or they may be subjected again to solvent extraction.

It is to be understood that by identifying the solvents of this invention by chemical names, it is intended to include not only the chemically pure substances, but also the products of commerce which may contain various impurities, as well as various solutions and mixtures containing effective quantities of these substances and suitable for treating hydrocarbon oils by solvent extraction.

It is also understood that the sulfur ring compounds, or the commercial products containing effective quantities of these compounds, can be advantageously used in dewaxing mineral oils. The oil to be dewaxed, such, for example, as the raffinate phase obtained in an extraction process, may be saturated, either in the presence or in the absence of a dewaxing diluent, such as light naphtha, liquid propane, benzol, etc., with one of the sulfur ring compounds forming the subject of this invention, the mixture being subsequently chilled and the wax separated in conventional manner.

As carbon-substituted derivatives of the thiazole group may further be used benzothiazole, 2 and 6 methyl-benzothiazole, 2 amino benzothiazole, 2 anilino benzothiazole oxy benzothiazole, 2 mercapto benzothiazole, 2 phenyl benzothiazole. Also non-condensed thiazole compounds having more than one nucleus, such as 2 phenyl thiazole or 4 phenyl thiazole, as well as derivatives thereof, may be used.

Non-condensed thiophene compounds having more than one nucleus are also useful. Examples are: phenyl thiophene and derivatives.

Use may further be made of compounds built up of thiophene rings, but with carbon atoms between the rings. Examples are tri thienyl-methane $\{CH(C_4H_3S)_3\}$ or di-$\alpha$ thienyl keton [thienon $CO(C_4H_3S)_2$]

As penthiophene derivatives may be used condensed compounds, e. g. benzo penthiophene compounds, like thio cumarine or thioxanthon (9 oxo thioxanthene as well as thioxanthene itself and its derivatives).

It goes without saying that in all the above-mentioned compounds groups like the alkyl, CN, $NO_2$, CO, OR, SCN, Cl, etc. may be substituted.

I claim as my invention:

1. The process for refining a hydrocarbon oil which comprises separating an oil into fractions of different chemical constituents by extracting said oil with a solvent comprising a carbon substituted derivative of a sulfur ring compound having as a substituent a radical containing a carbonyl group.

2. The process according to claim 1 in which the substituent is an aldehyde radical.

3. The process according to claim 1 in which the carbon substituted derivative is thiophene aldehyde.

4. In the art of refining mineral oils, the process which comprises bringing a mineral oil containing paraffinic and naphthenic hydrocarbons into contact with thiophene aldehyde thereby to effect solution of a portion richer in naphthenic hydrocarbons in the solvent, and separating the solution so formed from the remainder of the oil, thereby to obtain fractions of the oil respectively richer in paraffinic and naphthenic hydrocarbons.

5. The process for refining a cracked distillate to remove sulfur compounds therefrom which comprises the step of bringing said distillate into contact with a quantity of a solvent comprising a carbon substituted derivative of a sulfur ring compound having as a substituent a radical containing a carbonyl group to form two liquid phases, and separating said phases.

6. The process for refining a cracked distillate to remove sulfur compounds therefrom which comprises the step of bringing said distillate into contact with a quantity of a solvent comprising thiophene aldehyde to form two liquid phases, and separating said phases.

7. The process for refining a cracked distillate to remove sulfur compounds therefrom which comprises the step of bringing said distillate into contact with a quantity of a solvent comprising a cyano thiophene to form two liquid phases, and separating said phases.

WILLEM J. D. van DIJCK.